US006421311B1

United States Patent
Nakazato et al.

(10) Patent No.: US 6,421,311 B1
(45) Date of Patent: Jul. 16, 2002

(54) OPTICAL DISK APPARATUS FOR PREVENTING DAMAGE TO AN OPTICAL DISK

(75) Inventors: Hiroyuki Nakazato, Kawasaki; Hiromi Nakanishi, Yokohama, both of (JP)

(73) Assignee: Kabushiki Kaisha Toshiba, Kawasaki (JP)

(*) Notice: Subject to any disclaimer, the term of this patent is extended or adjusted under 35 U.S.C. 154(b) by 0 days.

(21) Appl. No.: 09/169,000

(22) Filed: Oct. 9, 1998

(30) Foreign Application Priority Data

Oct. 13, 1997 (JP) .............................................. 9-279158

(51) Int. Cl.[7] .............................................. G11B 33/02
(52) U.S. Cl. ..................................................... 369/77.1
(58) Field of Search .............................. 369/77.1, 77.2, 369/75.1, 75.2

(56) References Cited

U.S. PATENT DOCUMENTS 5,844,874 A * 12/1998 Saito et al. ................. 369/75.2
5,878,013 A * 3/1999 Maeda et al. ............... 369/77.1

* cited by examiner

Primary Examiner—David Davis
(74) Attorney, Agent, or Firm—Pillsbury Winthrop LLP

(57) ABSTRACT

An optical disk apparatus is provided with an outer casing, a tray, a disk driving motor, holding claws, and bosses. The tray is movable in and out of the interior of the outer casing. An optical disk, which is either uncovered or contained in a cartridge, is placed on the tray for information processing. The disk driving motor, located inside the outer casing, rotates the optical disk when the optical disk is placed thereon and conveyed into the outer casing while being held on the tray. The holding claws are provided on the tray. When the outer casing is stood and the optical disk is uncovered, the holding claws hold the optical disk. The bosses retreat the holding claws in a direction away from the optical disk only when the optical disk held by the holding claws is fitted on the optical disk driving motor.

1 Claim, 20 Drawing Sheets

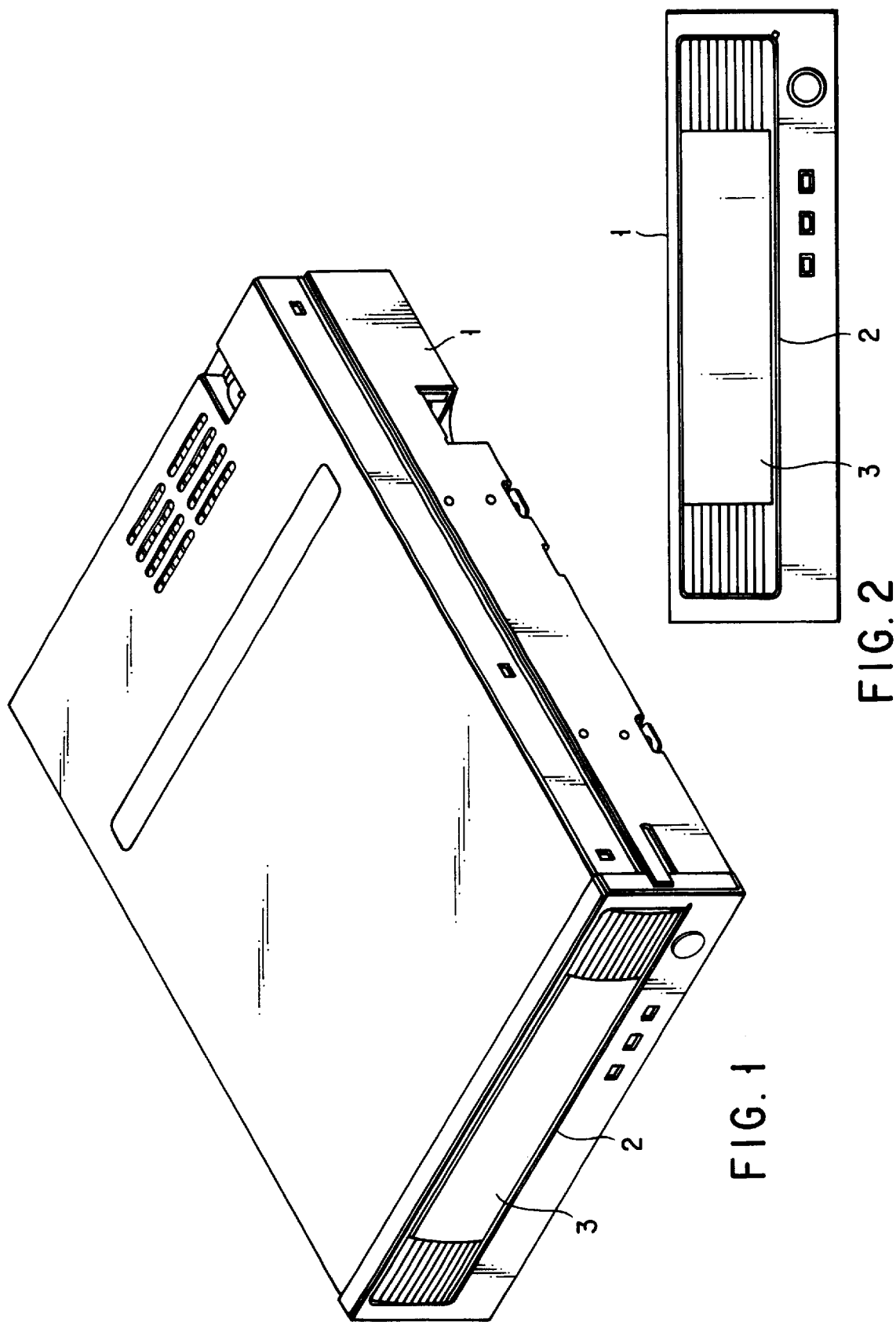

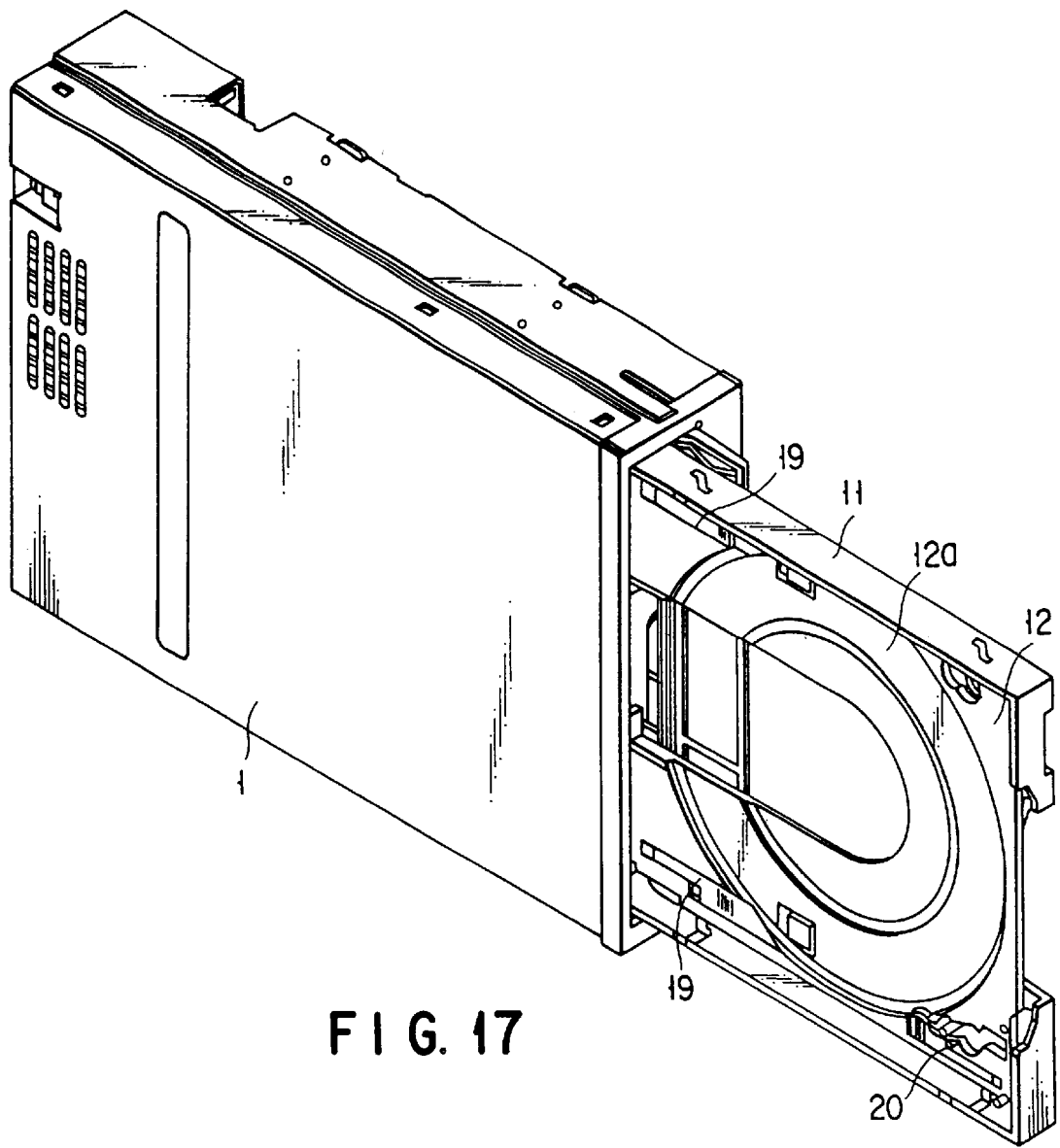
F I G. 17
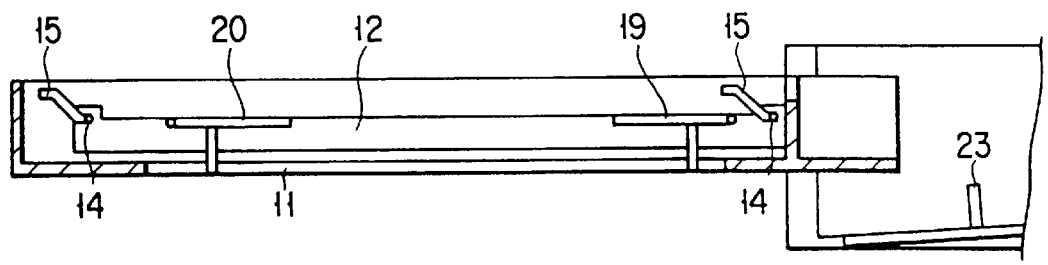
F I G. 18

OPTICAL DISK APPARATUS FOR PREVENTING DAMAGE TO AN OPTICAL DISK

BACKGROUND OF THE INVENTION

The present invention relates to an optical disk apparatus used with an uncovered optical disk or an optical disk cartridge inserted.

One known type of optical disk apparatus is provided with a tray which can move into or out of the interior of an outer casing. When the tray is pulled out, either an uncovered optical disk or an optical disk cartridge is placed on the tray, and then the tray is pushed into the interior of the outer casing.

Inside the outer casing, the optical disk is set on a turntable and rotated by a driving motor. During rotation, the optical disk is scanned with a light beam emitted from an optical head, and information processing is carried out.

The known optical disk apparatuses include a type which can be used as a vertical type or a horizontal type according to need. In other words, it can be used in the state where it is stood or laid.

Where the optical disk apparatus is stood and an uncovered optical disk is used, the disk should not be merely placed on the tray. This is because the disk will fall off the tray when the tray is vertical.

To prevent the optical disk from falling, the tray is provided with holding claws, and the tip ends of these holding claws are engaged with the outer circumference of the disk. Since the disk is held by the claws, it does not fall off the tray even when the tray is vertical. However, when the optical disk is set on the turntable and rotated, with the holding claws engaged therewith, it is likely that the tip ends of the claws will damage the surface of the disk.

To solve this problem, the holding claws are moved away from the optical disk to a retreat position when the disk is placed on the turntable. As long as the tip ends of the holding claws are kept away from the disk, damage to the disk is prevented.

In the conventional art, the tip ends of the holding claws are moved away from the disk even if the optical disk is stored in a cartridge. Due to this, it is likely that the tip ends of the holding claws will collide with the cartridge, resulting in damage.

In an effort to solve this problem, a certain space is provided between the tray and the cartridge in the case of the prior art. Although this structure prevents the tip ends of the holding claws and the cartridge from interfering with each other, the optical disk apparatus is inevitably large in size.

BRIEF SUMMARY OF THE INVENTION

The present invention has been made in due consideration of the above problems, and an object of the invention is to provide an optical disk apparatus capable of preventing interference between a holding means and a cartridge, with no need to provide a space between a tray and a cartridge.

To achieve this object, the present invention provides an optical disk apparatus comprising: an outer casing; tray means, being movable into or out of the outer casing, for supporting an optical disk placed thereon for information processing, the optical disk being one of an uncovered type and a cartridge type; optical disk driving means, arranged inside the outer casing, for rotating the optical disk when the optical disk is fitted thereon after it is conveyed into the outer casing while being held on the tray means; holding means, provided for the tray means, for holding the optical disk when the outer casing is stood and the optical disk is an uncovered type; and retreat means for retreating the holding means in a direction away from the optical disk only when the optical disk held by the holding means is fitted on the optical disk driving means.

With this structure, the holding means is not retreated when the optical disk stored in the cartridge is set on the driving means. Accordingly, interference between the cartridge and the holding means can be prevented without providing a space therebetween.

Additional objects and advantages of the invention will be set forth in the description which follows, and in part will be obvious from the description, or may be learned by practice of the invention. The object and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 1 is a perspective view showing a state where an optical disk apparatus according to one embodiment of the present invention is laid.

FIG. 2 is a front view of the optical disk apparatus.

FIG. 17 is a perspective view of the optical disk apparatus that is stood, the tray of the optical disk apparatus being pulled out for loading an optical disk.

FIG. 18 is a cross sectional view of the tray that has been pulled out.

FIG. 20 is a cross sectional view showing the state where the tray has been pushed in.

FIG. 26 is a cross sectional view showing the state where the tray has been pulled in.

DETAILED DESCRIPTION OF THE INVENTION

One embodiment of the present invention will now be described with reference to the accompanying drawings.

FIG. 1 is a perspective view showing how an optical disk apparatus is laid, and FIG. 2 is a front view of the apparatus in this state.

Figure 4:
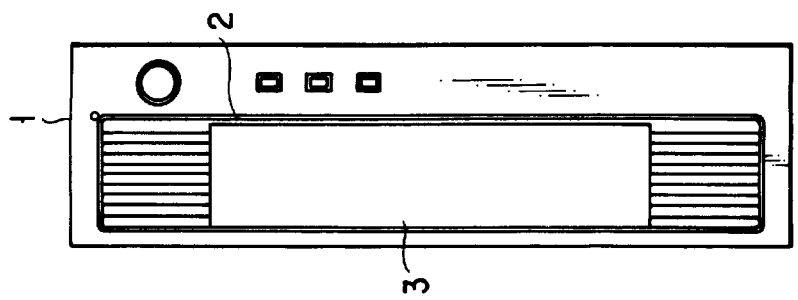
FIG. 4 is a front view of the optical disk apparatus.
Figure 3:
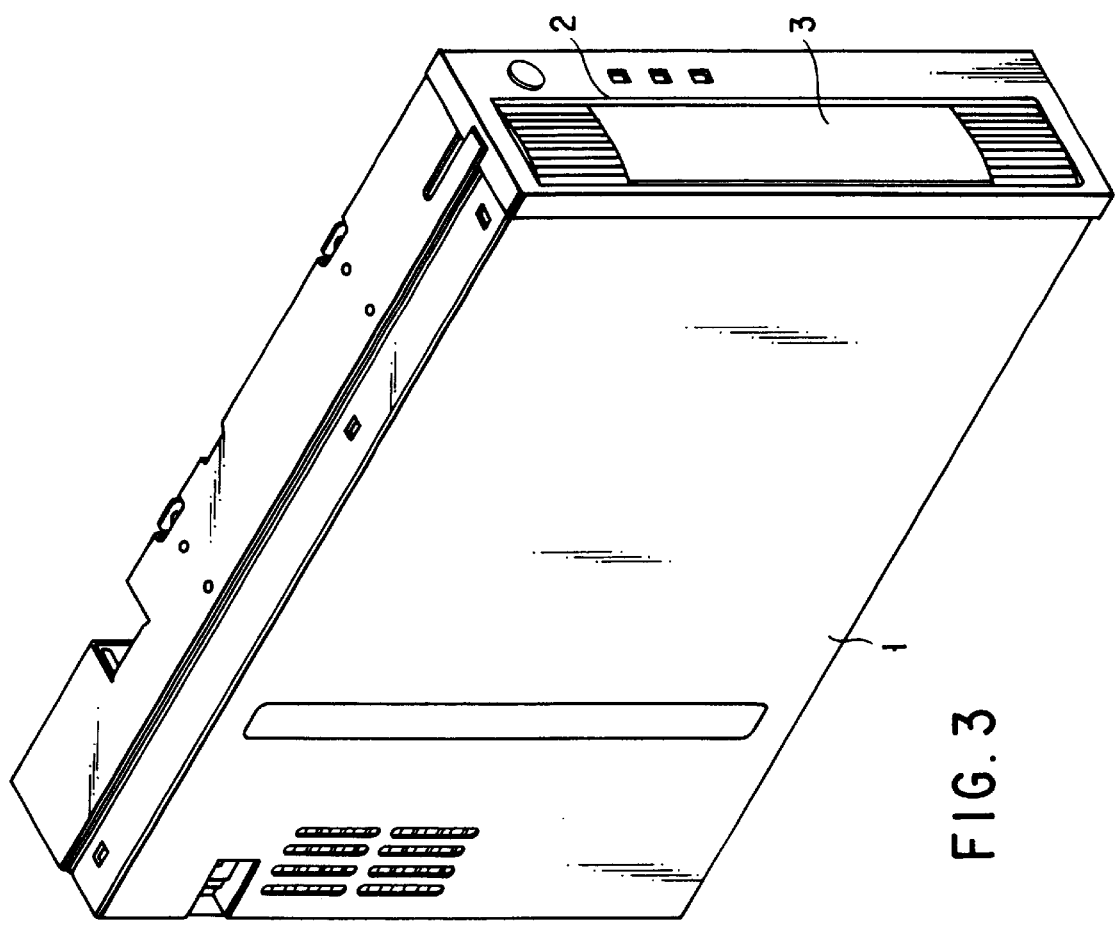
FIG. 3 is a perspective view showing a state where the optical disk apparatus is stood.

FIG. 3 is a perspective view showing how the optical disk apparatus is stood, and FIG. 4 is a front view of the apparatus in this state.

In FIGS. 1–4, reference numeral 1 denotes an outer casing of the optical disk apparatus. An inlet/outlet port 2, through which a tray described later is moved in or out, is formed in the front portion of the outer casing 1. An opening/closing shutter 3 is provided to open or close the inlet/output port 2.

Figure 5:
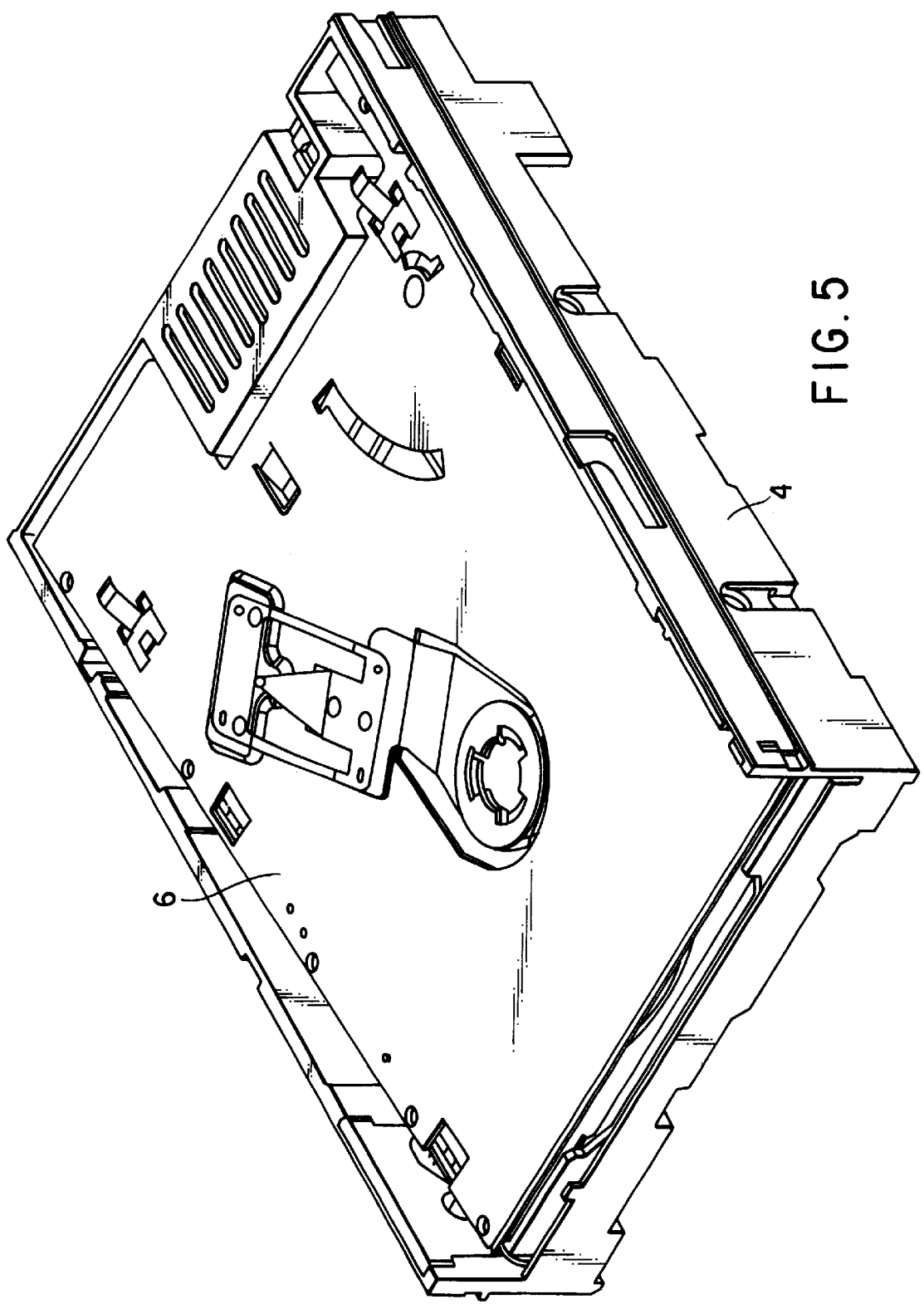
FIG. 5 is a perspective view showing the interior of the optical disk apparatus.

FIG. 5 shows the interior of the outer casing 1.

In FIG. 5, reference numeral 4 denotes a mold base. A holder 6 is provided in the mold base 4. The holder 6 slidably holds a tray 5, which serves as a tray means described later. The holder 6 is swingable. When it is swung to the lower position, an optical disk on the tray 5 is brought into engagement with a spindle motor 8, by which the optical disk is rotated.

Figure 6:
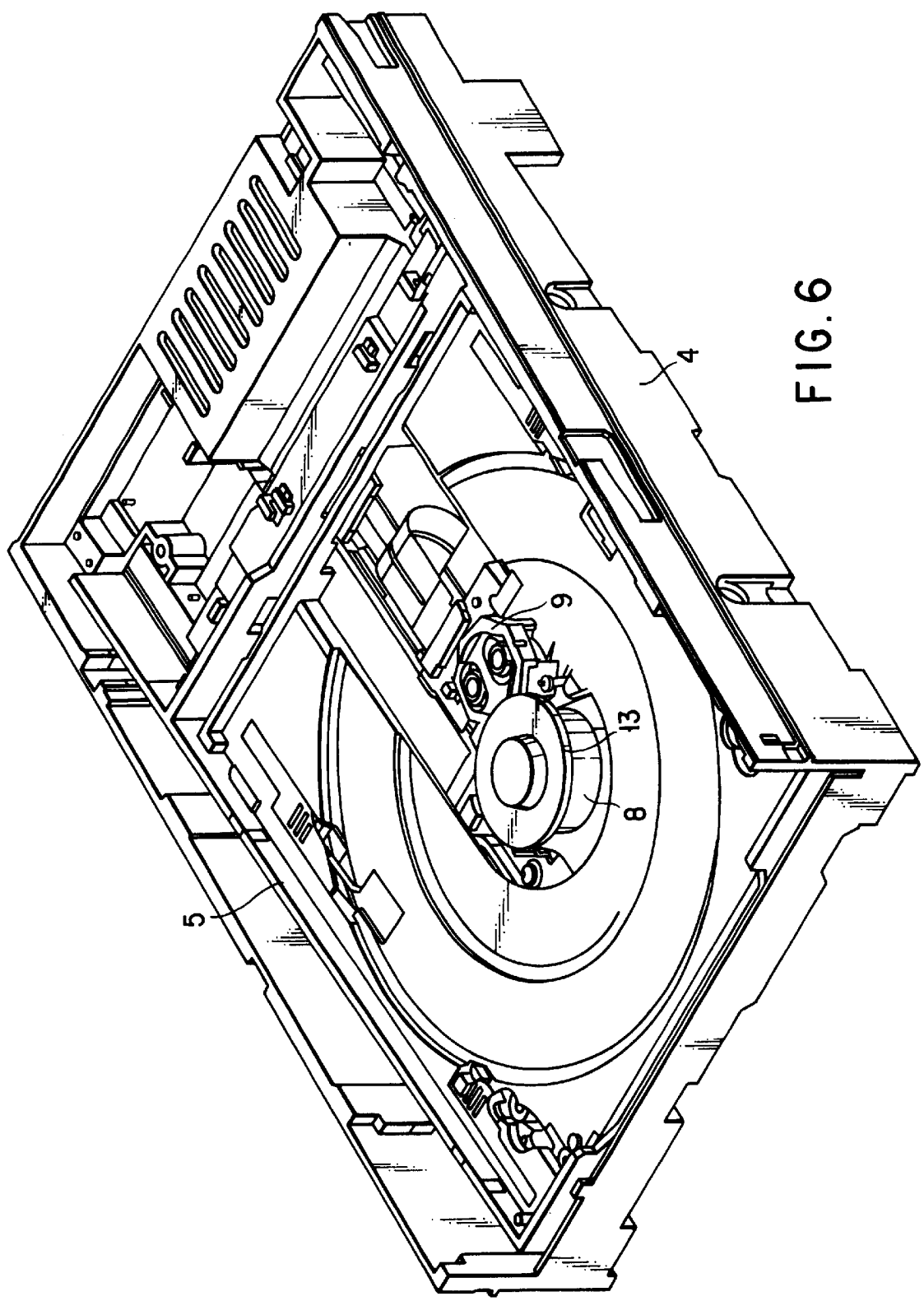
FIG. 6 is also a perspective view showing the interior of the optical apparatus.

FIG. 6 shows an optical head 9 for reading or writing information with reference to an optical disk. The optical head 9 is located above the tray 5 and the holder 6 inside the mold base 4, and movable in the radial direction of the spindle motor 8, i.e., in the radial direction of the optical disk set on the spindle motor 8.

Figure 7:
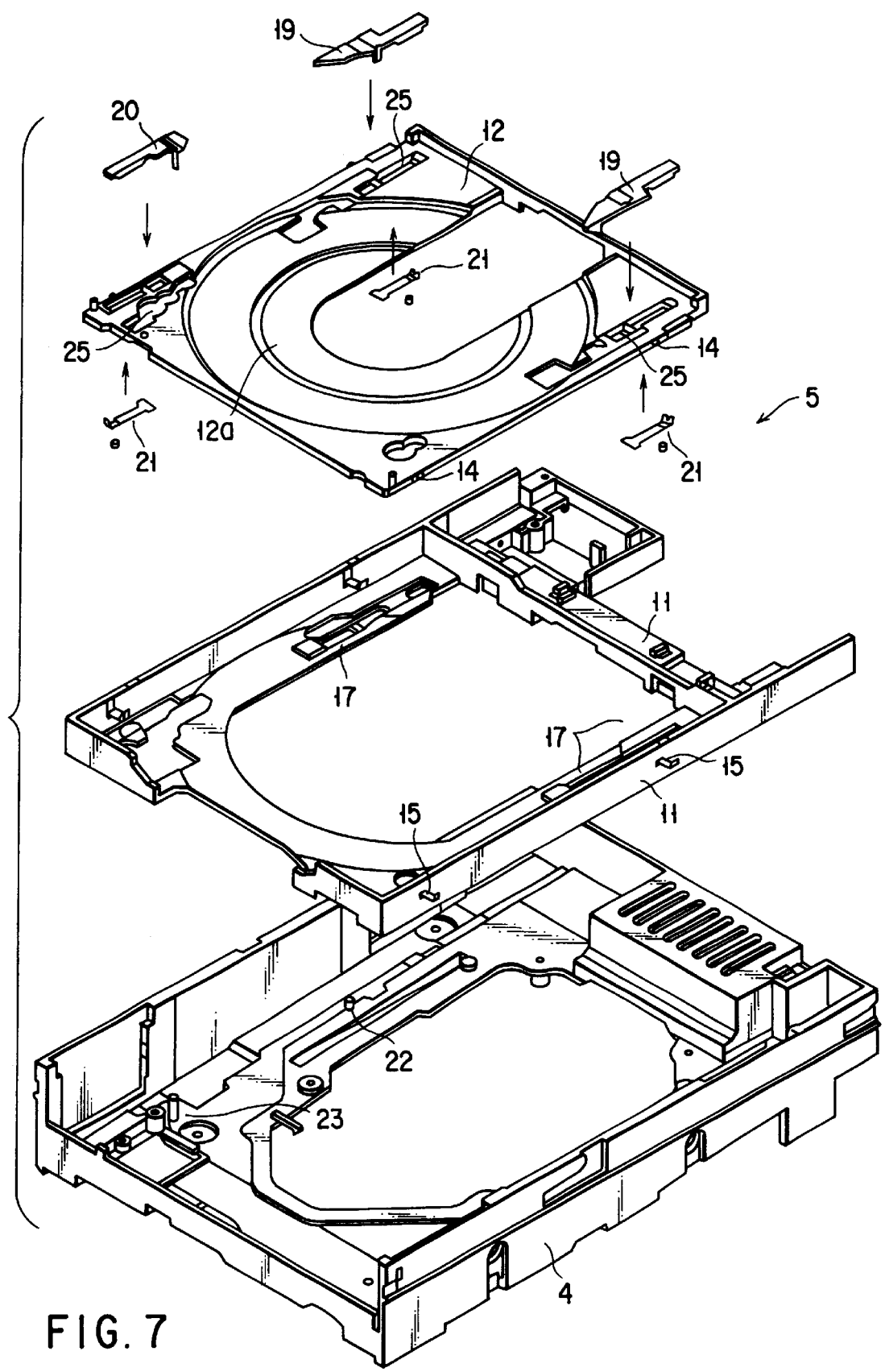
FIG. 7 is a perspective view showing a tray in an exploded manner.

FIG. 7 is a perspective view showing the mold base 4 and the tray 5 in an exploded manner.

The tray 5 is made of a main tray 11, and a sub tray 12 slidable on the main tray 11.

Projections 14 are formed on each side surface of the sub tray 12. Guide grooves 15, along which the respective projections 14 slide, are formed in the respective side surfaces of the main tray 11. The guide grooves 15 are inclined upward in the advancing direction of the sub tray 12.

Attachment holes 25 are formed in the side portions of the sub tray 12, in such a manner that two of them are located on the respective sides at the rear portion and the remaining one is located on one side at the front portion. Holding claws 19 and 20, serving as a holding means, are provided in the attachment holes 25 to be slidable and rotatable. (The holding claws located at the rear portion are represented by the reference numerals 19, while the holding claw located at the front portion is represented by the reference numeral 20.) Spring members 21 are provided inside the attachment holes 25 so as to elastically hold the holding claws 19 and 20 inside the attachment holes 25.

The holding claws 19 and 20 slide within their respective holes 25 in such a manner that their tip ends are projected out over the disk placement surface 12a of the sub tray 12. Auxiliary springs 17, used for lifting the holding claws 19 and 20, are provided on both sides at the rear portion of the main tray 11.

Bosses 22 and 23, serving as retreat means, are formed on the side portions of the inner bottom surface of the mold base 4, in such a manner that two of them are located on the respective sides at the middle portion and the remaining one is located on one side at the front portion. (The former two bosses are represented by the reference numerals 22, while the latter boss is represented by the reference numeral 23.)

Figure 8:
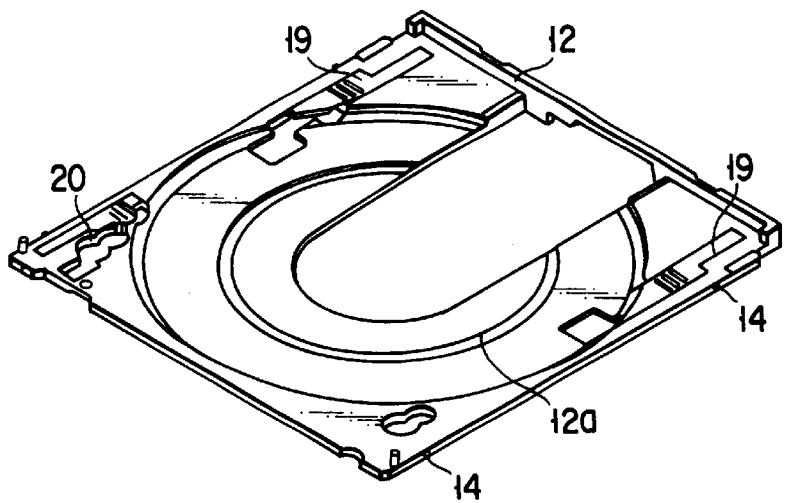
FIG. 8 is a perspective view of a sub tray provided with holding claws.

FIG. 8 shows a state where the holding claws are provided in the respective attachment holes 25 of the sub tray 12.

Figure 9:
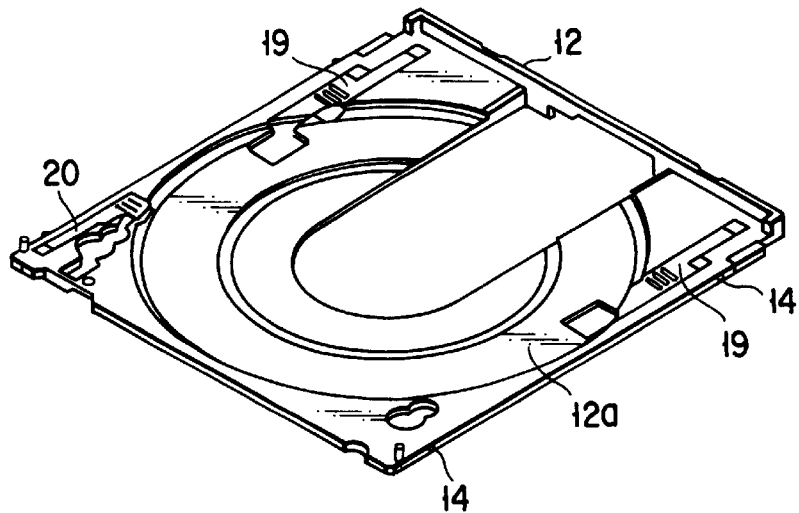
FIG. 9 is a perspective view of the sub tray whose holding claws are at the advance position.

FIG. 9 shows a state where the holding claws 19 and 20 slide in their respective holes 25 and where the tip ends of the claws are projected out over the disk placement surface 12a of the sub tray 12. An optical disk is held by means of the projected tip ends of the holding claws 19 and 20.

Figure 10:
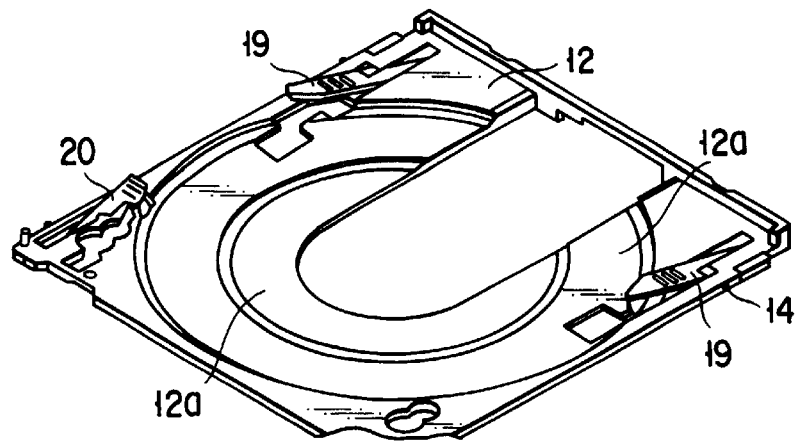
FIG. 10 is a perspective view of the sub tray and shows how the tip ends of the holding claws of the sub tray are raised.

FIG. 10 shows a state where the tip ends of the holding claws 19 and 20, which are slid in the respective attachment holes 25 toward the front of the sub tray 12, are lifted.

Since the tip ends of the holding claws 19 and 20 are lifted, they do not interfere with the optical disk.

Figure 11:
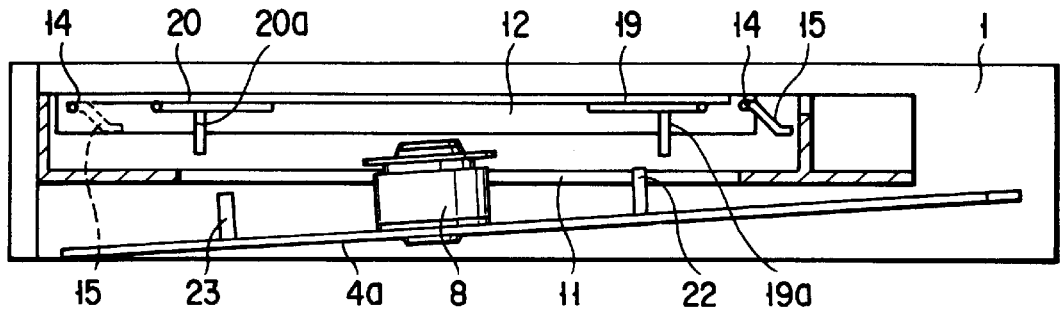
FIG. 11 shows how the sub tray is located when an uncovered optical disk is loaded.

FIG. 11 shows how the positional relationships between the main tray 11 and the sub tray 12 are when the optical disk set on the tray 5 is an uncovered type.

In the state shown in FIG. 11, the sub tray 12 is at the advance position. In other words, it is raised, with its projections 14 moved up along the guide grooves 15.

Figure 12:
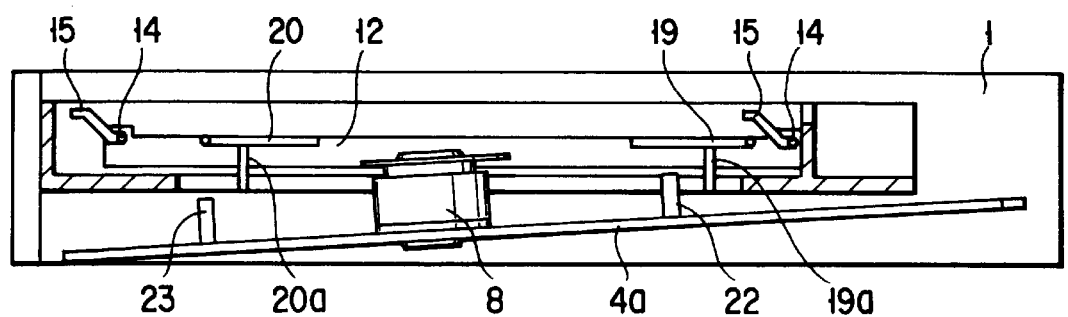
FIG. 12 shows how the sub tray is located when an optical disk cartridge is loaded.

FIG. 12 shows how the positional relationships between the main tray 11 and the sub tray 12 are when a cartridge is set on the tray 5.

In the state shown in FIG. 12, the sub tray 12 is at the retreat position. In other words, it is lowered, with its projections 14 moved down along the guide grooves 15.

The bottom plate 4a of the mold base 4 descends toward the inlet/output port 2 of the outer casing 1. When the holder 6 swings down, with its supported point as a center, an optical disk set on the tray 5 is brought into engagement with the spindle motor 8, whether it is uncovered or contained in a cartridge.

Figure 13:
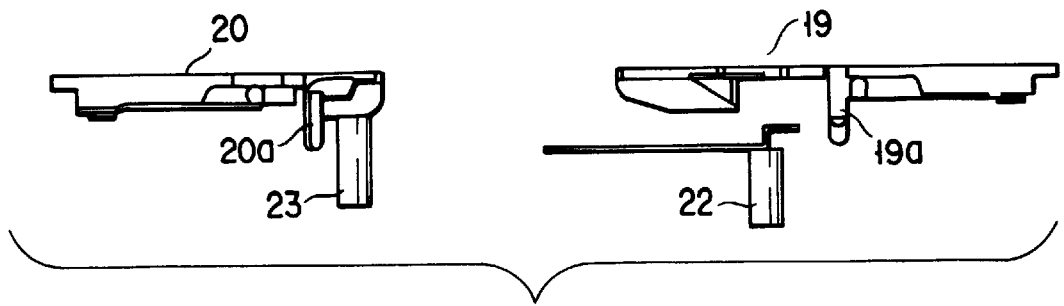
FIG. 13 shows how the holding claws are located when the optical disk apparatus is laid and an uncovered optical disk is loaded therein.

FIG. 13 shows how the holding claws 19 and 20 are located when the optical disk apparatus is laid and an uncovered optical disk is loaded therein.

In the state shown in FIG. 13, the sub tray 12 is located at the upper position inside the main tray 11. The holding claws 19 and 20 do not slide frontward in the attachment holes 25 of the sub tray 12. In other words, the legs 19a and 20a of the holding claws 19 and 20 are not opposed to the bosses 22 and 23 of the mold base 4. Therefore, even when the holder 6 is swung downward, the legs 19a and 20a of the holding claws 19 and 20 do not touch the bosses 22 and 23 of the mold base 4. Hence, the tip ends of the holding claws 19 and 20 are not raised.

Figure 14:
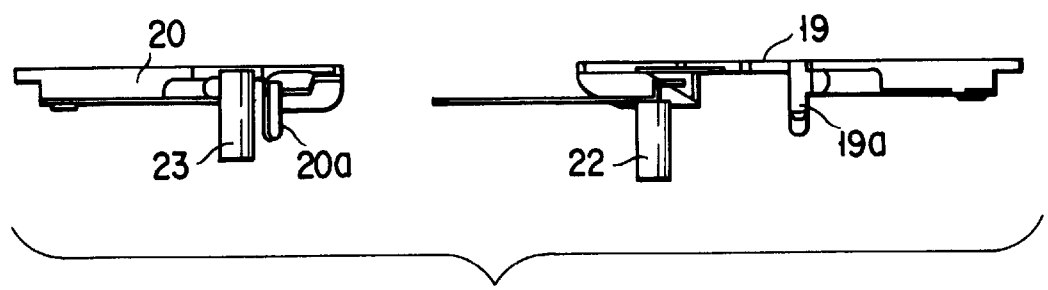
FIG. 14 shows how the holding claws are located when the optical disk apparatus is laid and an optical disk cartridge is loaded therein.

FIG. 14 shows how the holding claws 19 and 20 are located when the optical disk apparatus is laid and a cartridge is loaded therein.

In the state shown in FIG. 14, the sub tray 12 is located at the lower position inside the main tray 11. The holding claws 19 and 20 do not slide frontward in the attachment holes 25 of the sub tray 12. In other words, the legs 19a and 20a of the holding claws 19 and 20 are not opposed to the bosses 22 and 23 of the mold base 4. Therefore, even when the holder 6 is swung downward, the legs 19a and 20a of the holding claws 19 and 20 do not touch the bosses 22 and 23 of the mold base 4. Hence, the tip ends of the holding claws 19 and 20 are not raised.

Figure 15:
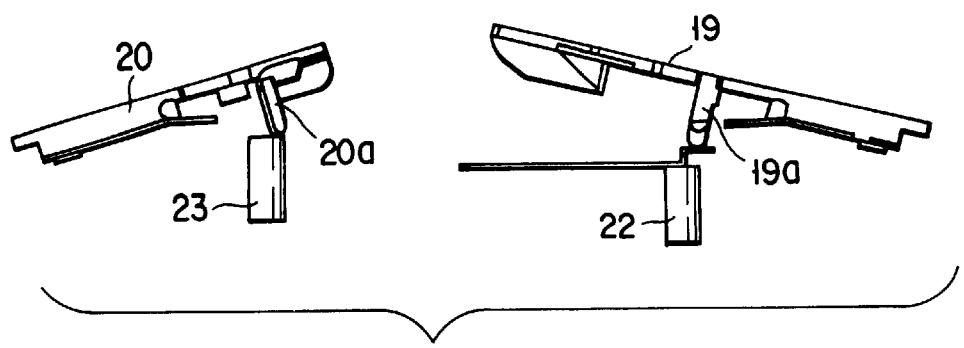
FIG. 15 shows how the holding claws are located when the optical disk apparatus is stood and an uncovered optical disk is loaded therein.

FIG. 15 shows how the holding claws 19 and 20 are located when the optical disk apparatus is stood and an uncovered optical disk is loaded therein.

In the state shown in FIG. 15, the sub tray 12 is located at the upper position inside the main tray 11. In this state, the holding claws 19 and 20 slide frontward in the attachment holes 25 of the sub tray 12. In other words, the legs 19a and 20a of the holding claws 19 and 20 are opposed to the bosses 22 and 23 of the mold base 4. Therefore, even when the holder 6 is swung downward, the legs 19a and 20a of the holding claws 19 and 20 touch the bosses 22 and 23 of the mold base 4. Hence, the tip ends of the holding claws 19 and 20 are raised.

Figure 16:
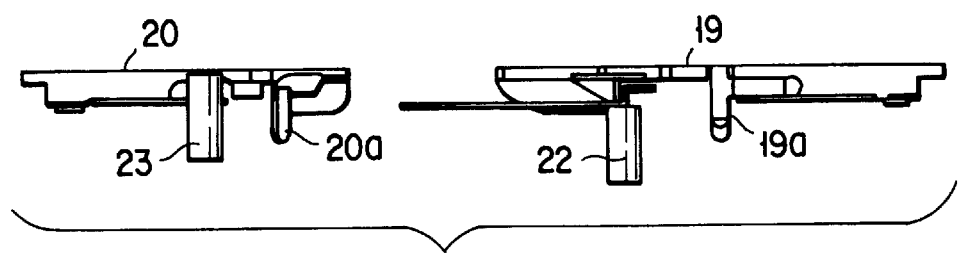
FIG. 16 shows how the holding claws are located when the optical disk apparatus is stood and an optical disk cartridge is loaded therein.

FIG. 16 shows how the holding claws 19 and 20 are located when the optical disk apparatus is stood and a cartridge is loaded therein.

In the state shown in FIG. 16, the sub tray 12 is retreated and located at the lower position inside the main tray 11. In this state, the holding claws 19 and 20 slide frontward in the attachment holes 25 of the sub tray 12. In spite of this, however, the legs 19a and 20a of the holding claws 19 and 20 are not opposed to the bosses 22 and 23 of the mold base 4, since the sub tray 12 is located at the lower position inside the main tray 11. Therefore, even when the holder 6 is swung downward, the legs 19a and 20a of the holding claws 19 and 20 do not touch the bosses 22 and 23 of the mold base 4. Hence, the tip ends of the holding claws 19 and 20 are not raised.

FIGS. 17 through 22 illustrate the case where the optical disk apparatus is stood and an uncovered optical disk D is loaded therein.

Figure 19:
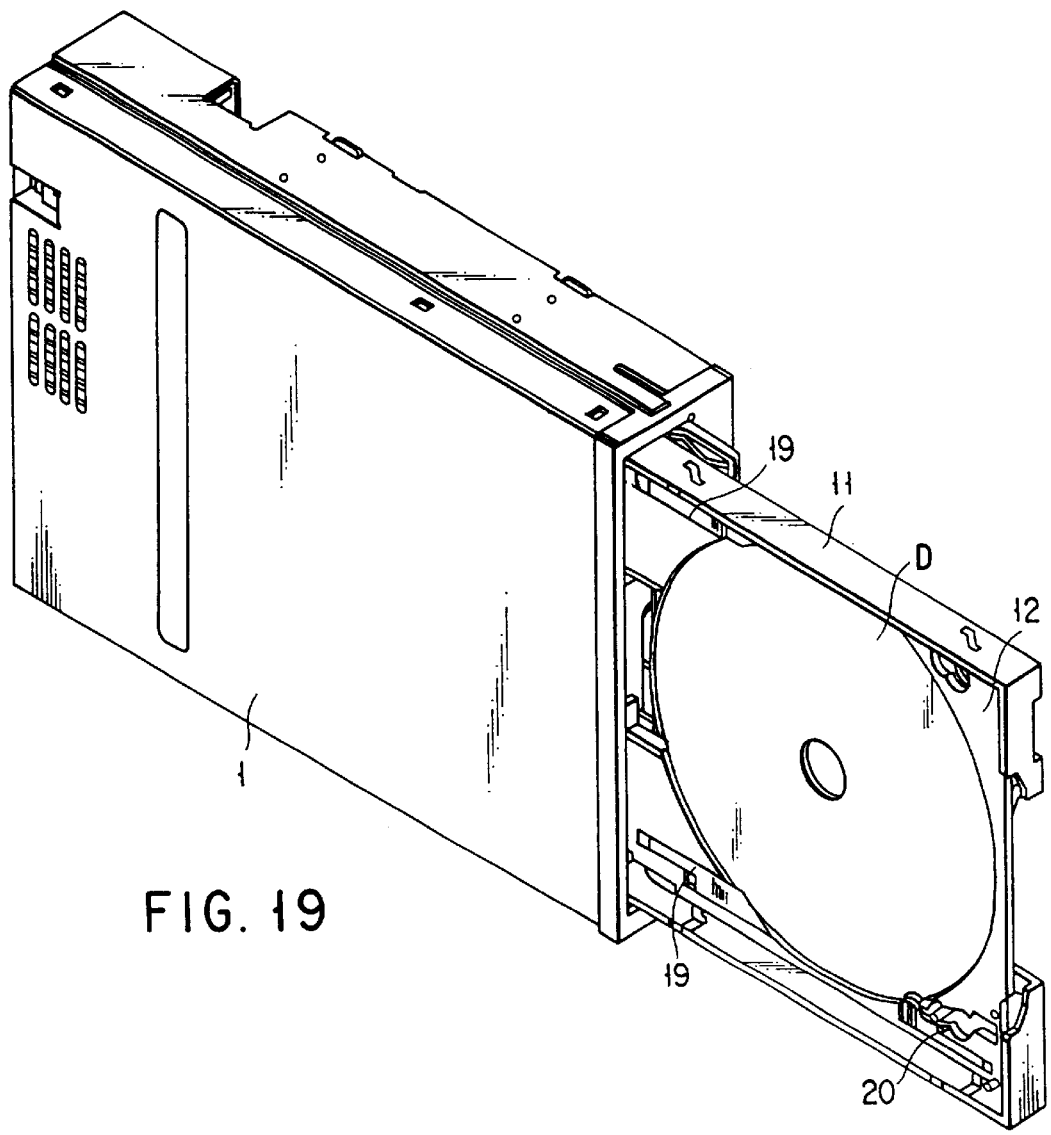
FIG. 19 is a perspective view of the optical disk apparatus and shows how an optical disk is set on the tray.
Figure 20:
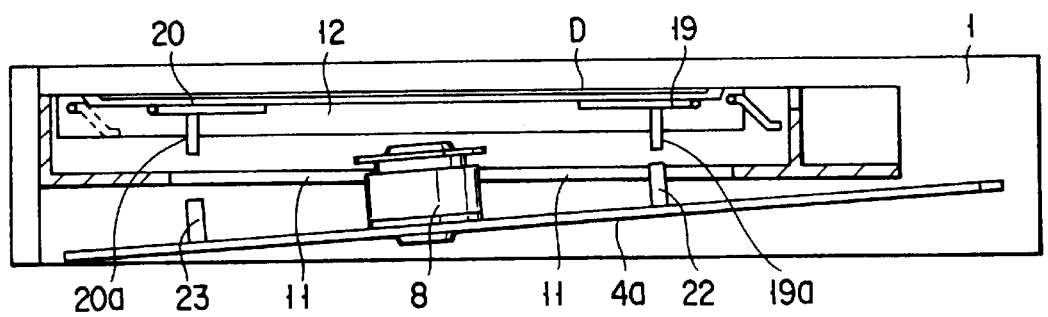
Figure 21:
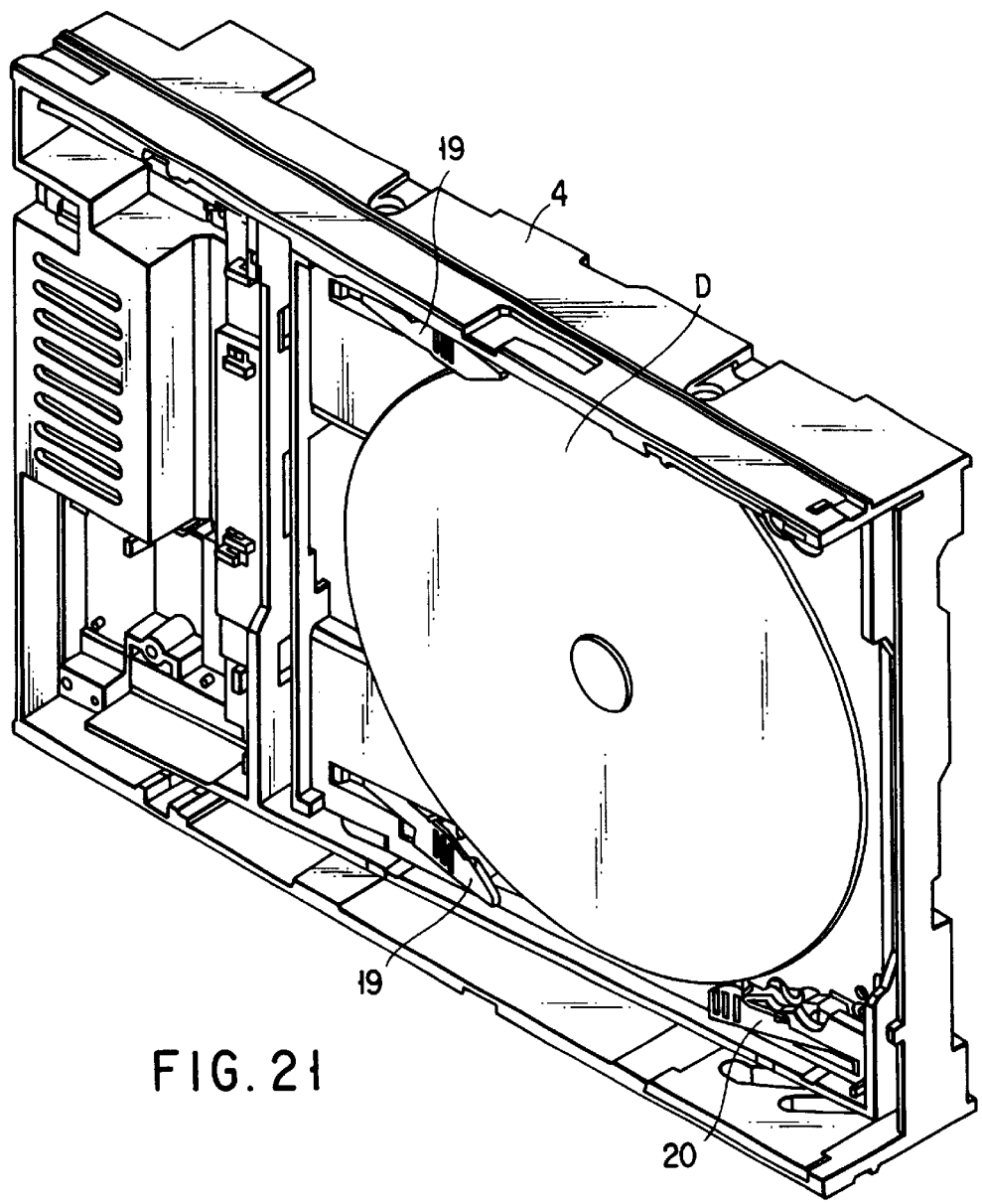
FIG. 21 is a perspective view showing the state where the optical disk has been loaded.
Figure 22:
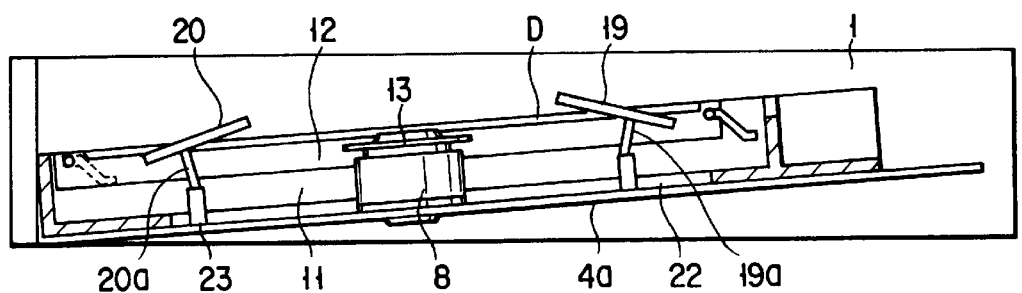
FIG. 22 is a cross sectional view showing the state where the optical disk has been loaded.

As shown in FIG. 17, the main tray 11 is pulled out from the outer casing 1. At the time, the sub tray 12 is retreated, as shown in FIG. 18. That is, the projections 14 of the sub tray 12 descend along the guide grooves 15 of the main tray 11, and the sub tray 12 comes to the lower position inside the main tray 11. Thereafter, as shown in FIG. 19, the uncovered optical disk D is set on the disk placement surface 12a of the sub tray 12, and the tip ends of the holding claws, which are then in the advanced state, are brought into engagement with the outer circumference of the optical disk D to hold the optical disk D. After the optical disk D is held in this manner, the main tray 11 is inserted into the outer casing 1, as shown in FIG. 20. As a result of this insertion, the sub tray 12 is advanced and raises, and the legs 19a and 20a of the holding claws 19 and 20 are opposed to the bosses 22 and 23 of the mold base 4. Subsequently, the holder 6 is swung downward, as shown in FIGS. 21 and 22, so that the optical disk D is set on the turntable 13 of the spindle motor 8. At the time, the legs 19a and 20a of the holding claws 19 and 20 touch the bosses 22 and 23, thus raising the tip ends of the holding claws 19 and 20. As a result, the tip ends of the holding claws 19 and 20 are separated from the optical disk D, and interference between the claws 19 and 20 and the optical disk D is prevented.

FIGS. 23 to 28 illustrate the case where the optical disk apparatus is stood and a cartridge K is loaded therein.

Figure 23:
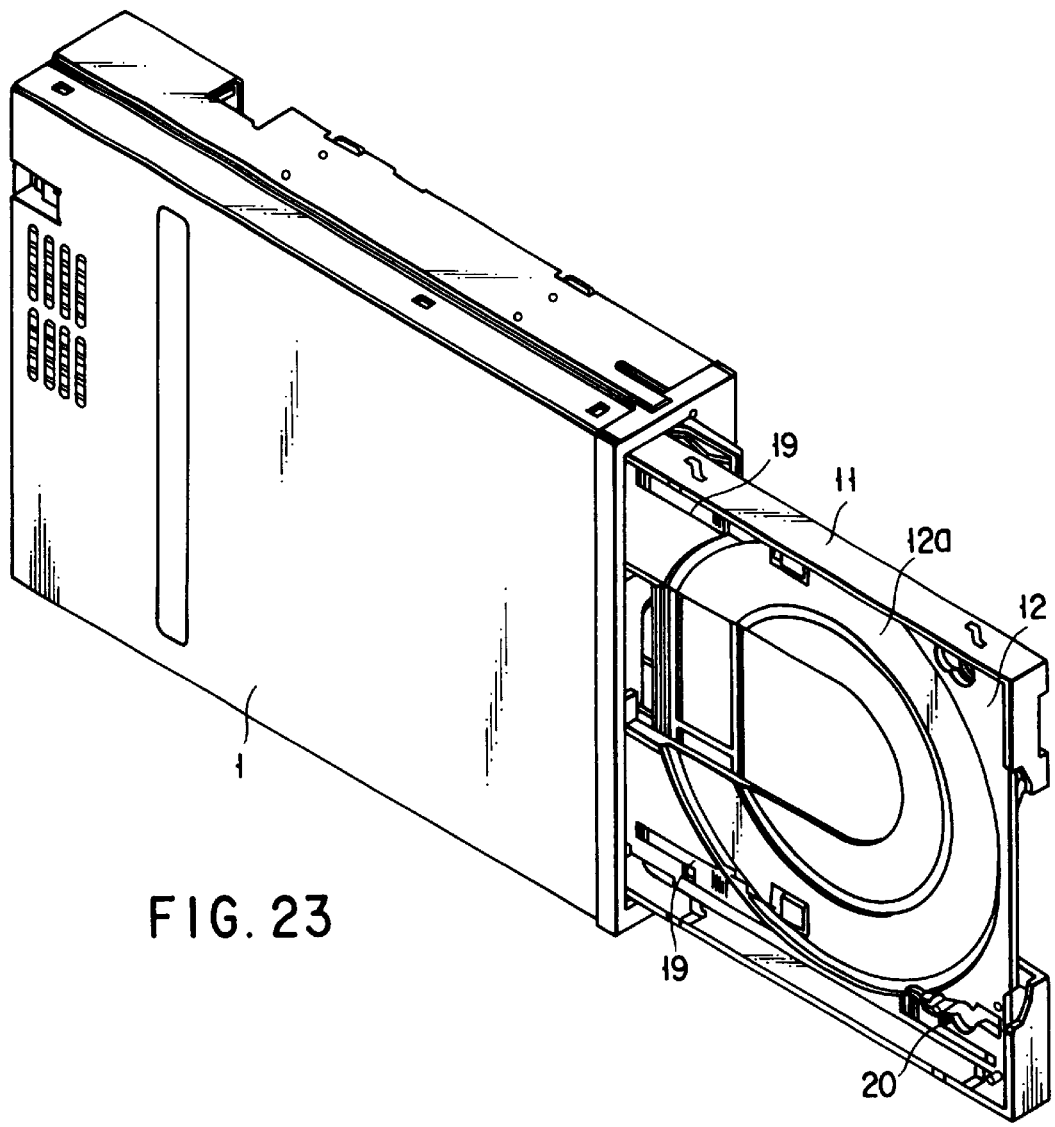
FIG. 23 is a perspective view of the optical disk apparatus that is stood, the tray of the optical disk apparatus being pulled out for loading an optical disk.
Figure 24:
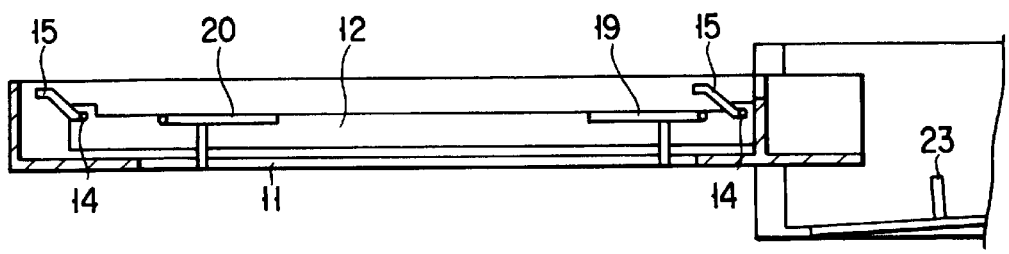
FIG. 24 is a cross sectional view of the optical disk apparatus that is stood, the tray of the optical disk apparatus being pulled out for loading an optical disk.
Figure 25:
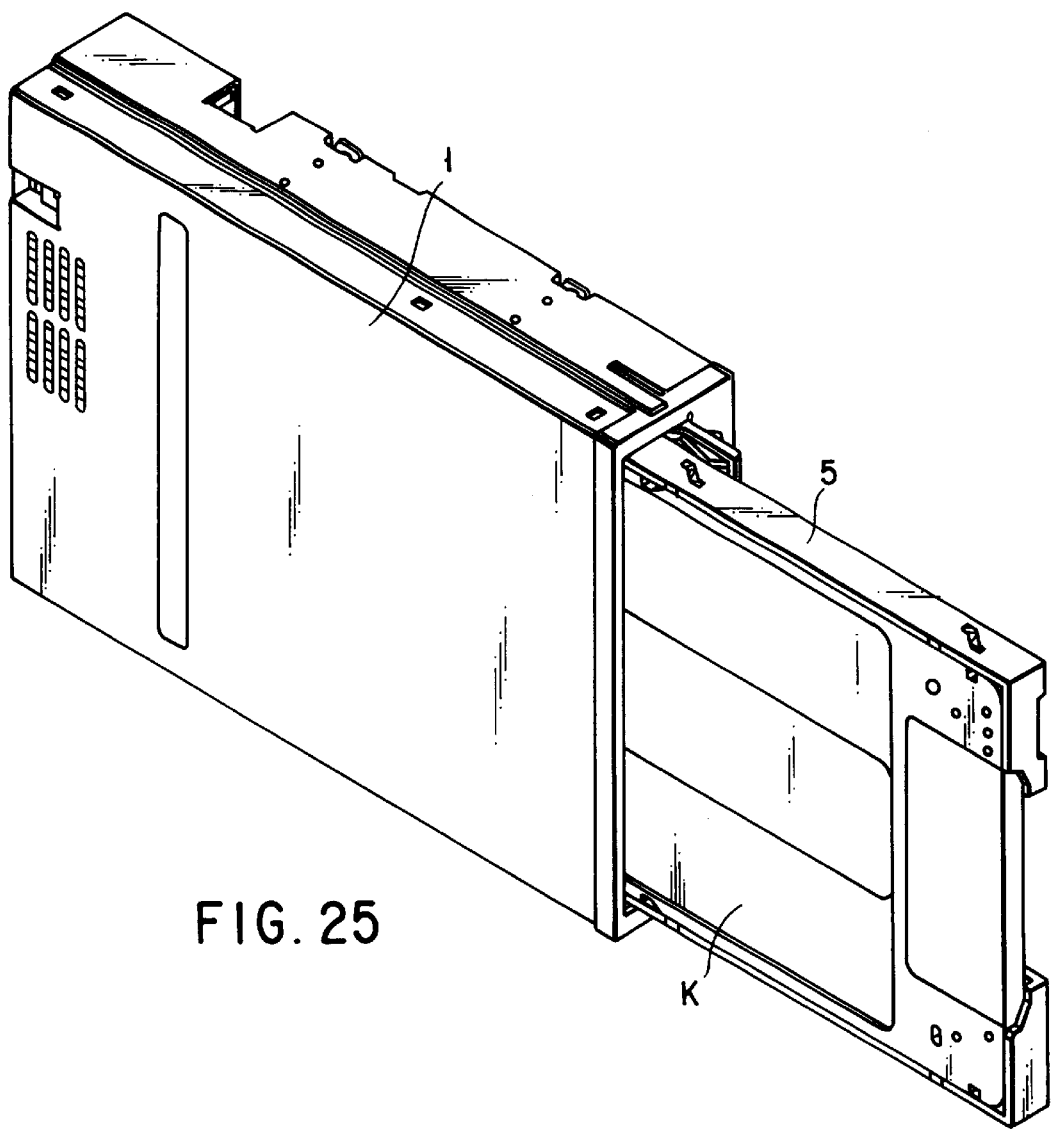
FIG. 25 is a perspective view showing the state where a cartridge has been set on the tray.
Figure 26:
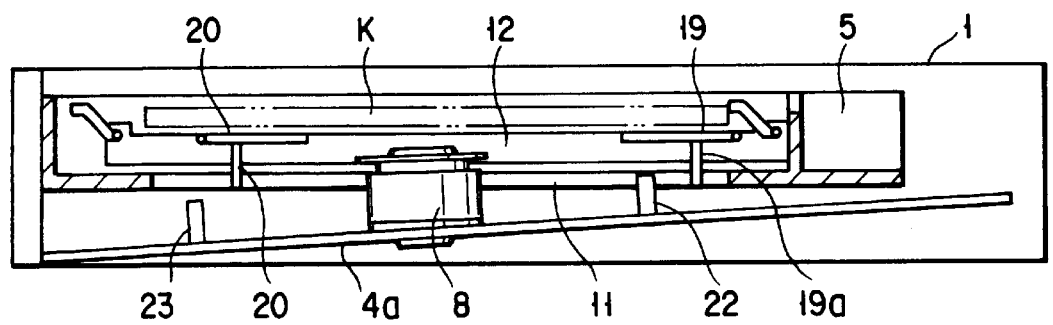
Figure 27:
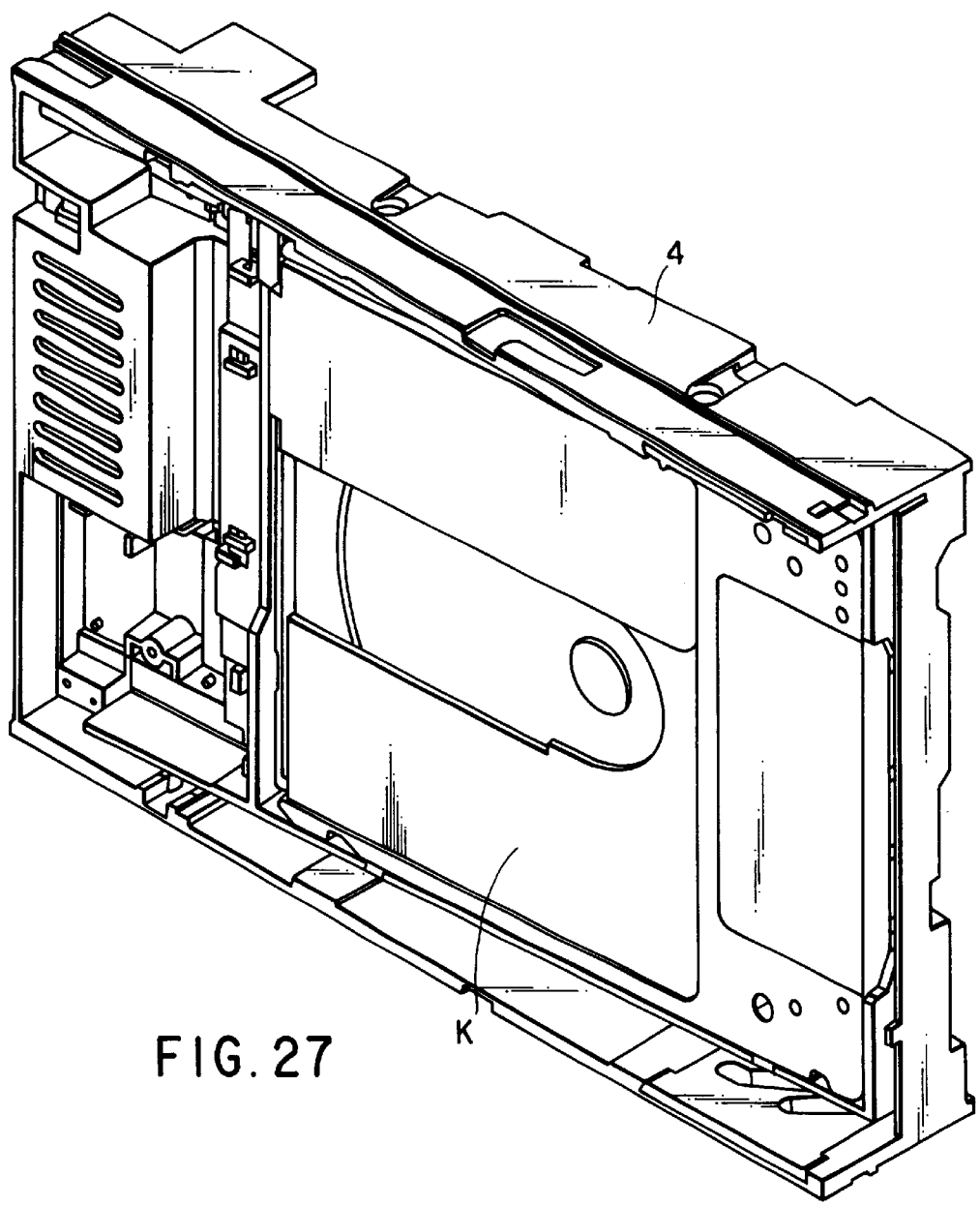
FIG. 27 is a perspective view showing the state where a cartridge has been loaded.
Figure 28:
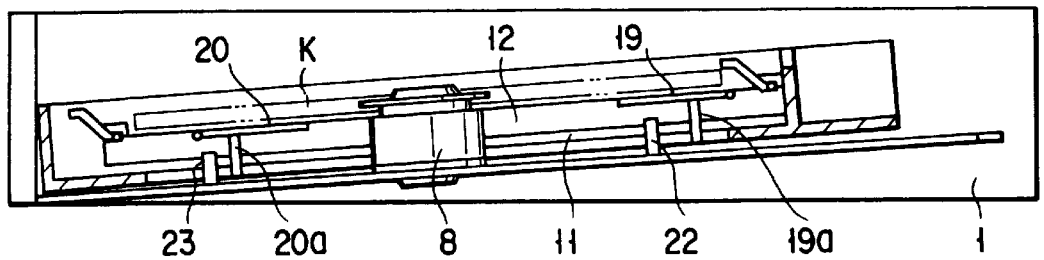
FIG. 28 is a cross sectional view showing the state where the cartridge has been loaded.

As shown in FIG. 23, the main tray 11 is pulled out from the outer casing 1. At the time, the sub tray 12 is retreated, as shown in FIG. 24. That is, the projections 14 of the sub tray 12 descend along the guide grooves 15 of the main tray 11, and the sub tray 12 comes to the lower position inside the main tray 11. In the meantime, the holding claws 19 and 20 are kept in the advanced state. In this state, the cartridge K is set on the sub tray 12, as shown in FIG. 25. Then, the main tray 11 is inserted into the outer casing 1, as shown in FIG. 26. At the time of insertion, the sub tray 12 remains retreated and lowered, and the legs 19a and 20a of the holding claws 19 and 20 are shifted from the bosses 22 and 23 of the mold base 4 and are not opposed thereto. In this state, the holder 6 is swung downward, as shown in FIGS. 27 and 28, so that the optical disk D in the cartridge K is set on the turntable 13 of the spindle motor 8. At the time, the legs 19a and 20a of the holding claws 19 and 20 do not touch the bosses 22 and 23, and the tip ends of the holding claws 19 and 20 are not raised.

Figure 29:
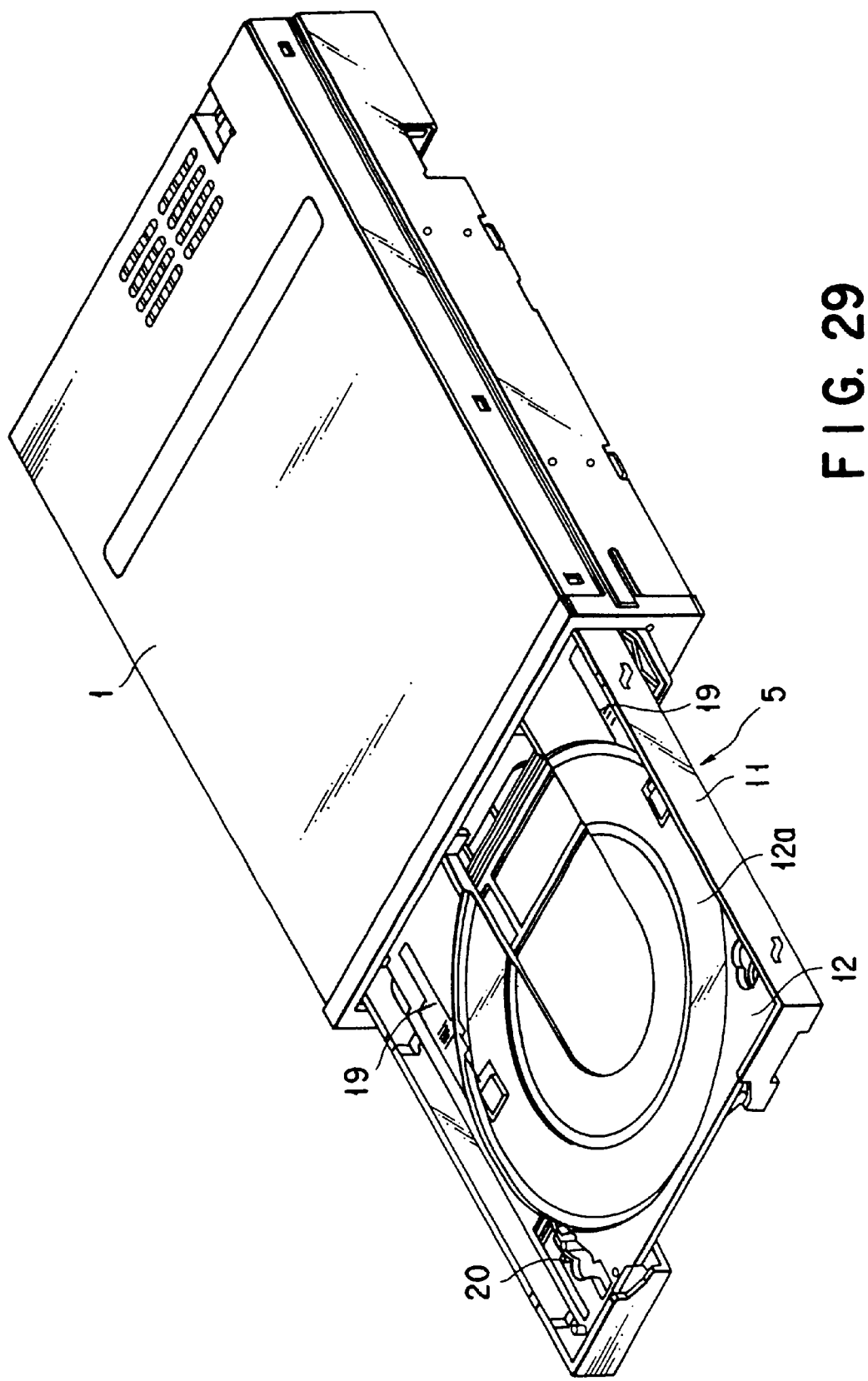
FIG. 29 is a perspective view of the optical disk apparatus that is laid, the tray of the optical disk apparatus being pulled out for loading an uncovered optical disk.
Figure 30:
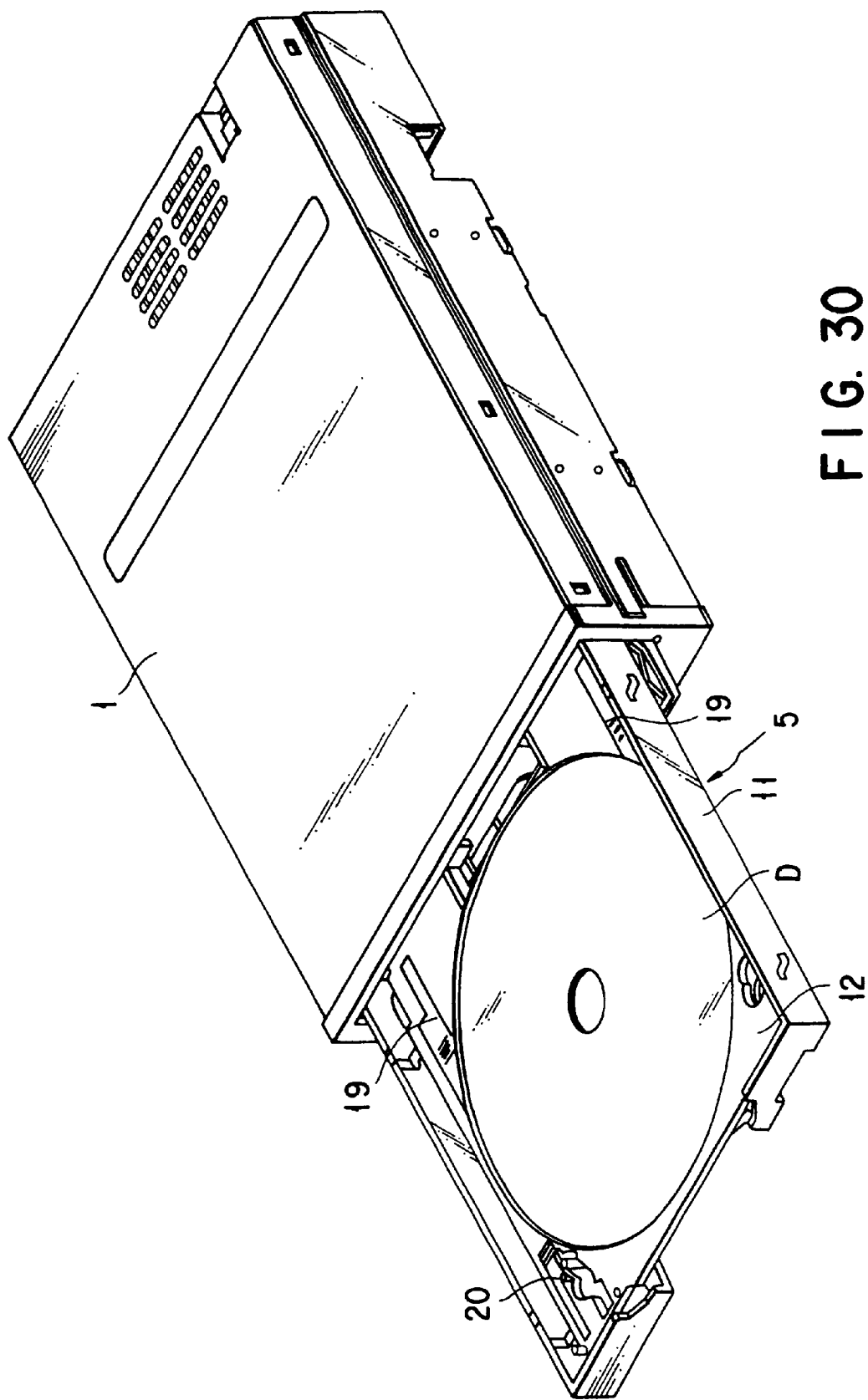
FIG. 30 is a perspective view showing a state where an optical disk is set on the tray.
Figure 31:
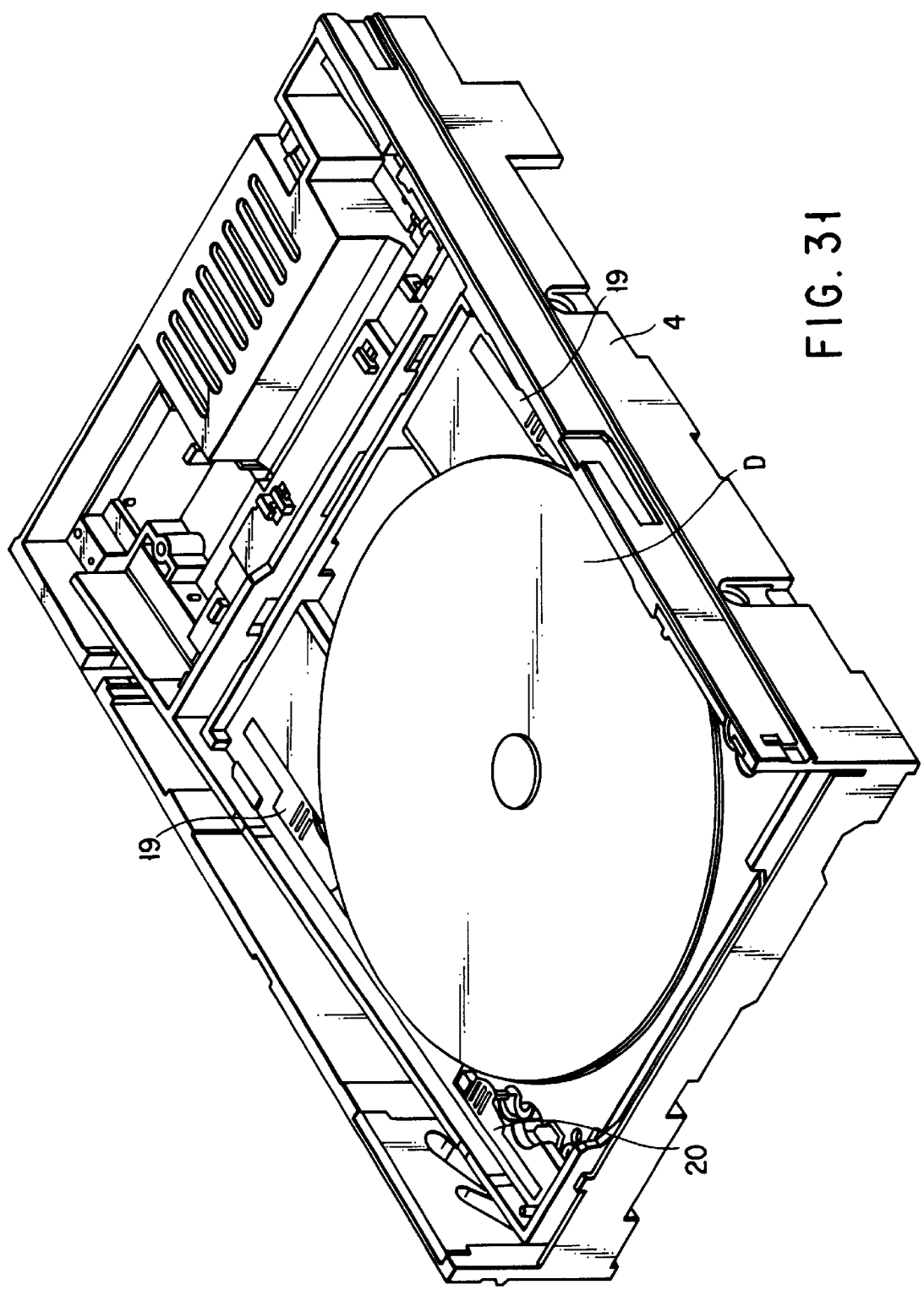
FIG. 31 is a perspective view showing the state where an optical disk has been loaded.

FIGS. 29 through 31 illustrate the case where the optical disk apparatus is laid and an uncovered optical disk D is loaded therein.

As shown in FIG. 29, the main tray 11 is pulled out from the outer casing 1. At the time, the sub tray 12 is retreated. That is, the projections 14 of the sub tray 12 descend along the guide grooves 15 of the main tray 11, and the sub tray 12 comes to the lower position inside the main tray 11. Thereafter, as shown in FIG. 30, the uncovered optical disk D is set on the disk placement surface 12a of the sub tray 12, and the main tray 11 is inserted into the outer casing, without advancing the holding claws 19 and 20 (i.e., without the optical disk D being held by the holding claws 19 and 20). At the time of insertion, the sub tray 12 is advanced and raised, and the legs 19a and 20a of the holding claws 19 and 20 are not opposed to the bosses 22 and 23 of the mold base 4. In this state, the holder 6 is swung downward, as shown in FIG. 31, so that the optical disk D is set on the turntable 13 of the spindle motor 8. At the time, the legs 19a and 20a of the holding claws 19 and 20 do not touch the bosses 22 and 23, and the tip ends of the holding claws 19 and 20 are not raised.

Figure 32:
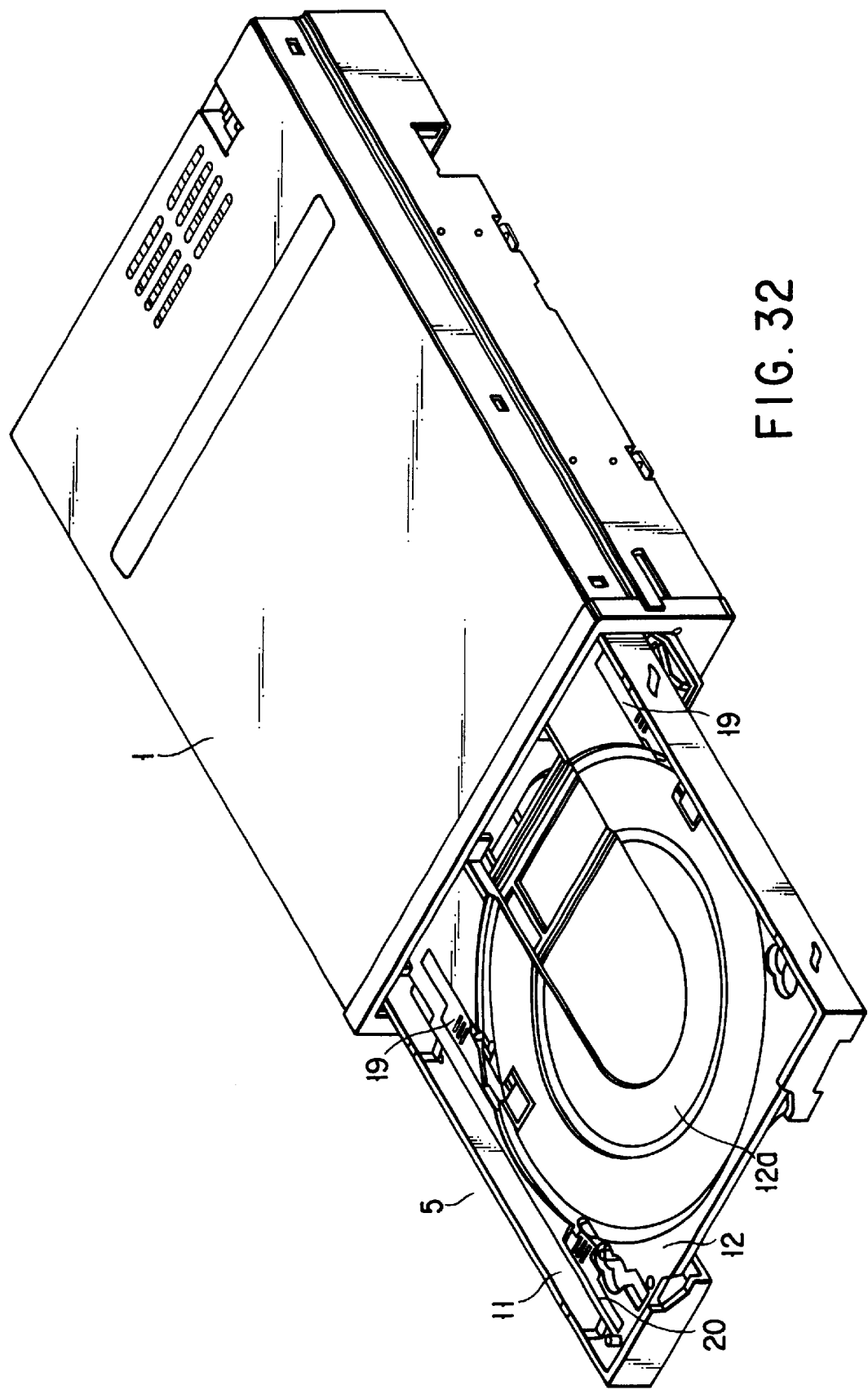
FIG. 32 is a perspective view of the optical disk apparatus that is laid, the tray of the optical disk apparatus being pulled out for loading a cartridge.
Figure 33:
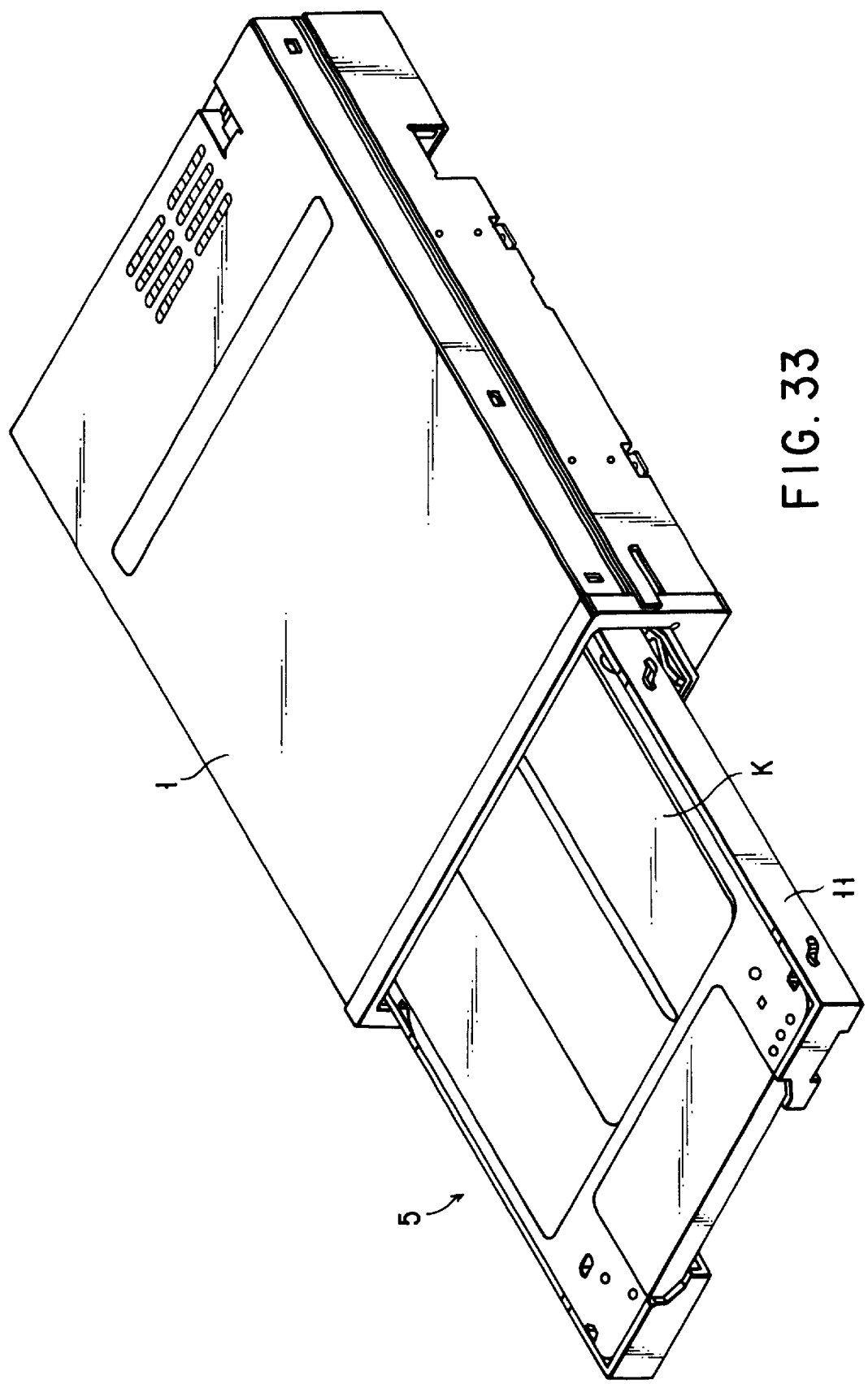
FIG. 33 is a perspective view showing the state where the cartridge has been set on the tray.
Figure 34:
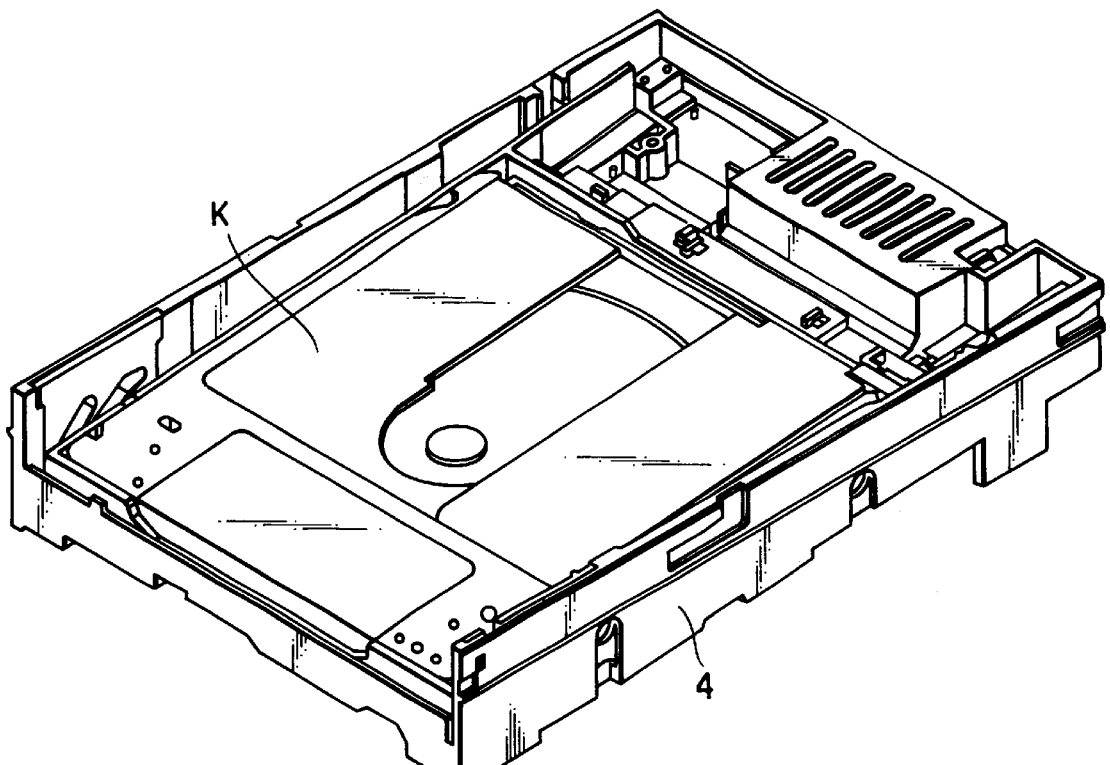
FIG. 34 is a perspective view showing the state where the cartridge has been loaded.

FIGS. 32 through 34 illustrate the case where the optical disk apparatus is laid and a cartridge K is loaded therein.

As shown in FIG. 32, the main tray 11 is pulled out from the outer casing 1. At the time, the sub tray 12 is retreated. That is, the projections 14 of the sub tray 12 descend along the guide grooves 15 of the main tray 11, and the sub tray 12 comes to the lower position inside the main tray 11. The holding claws 19 and 20 are not advanced in the meantime. The cartridge K is set on the sub tray 12, as shown in FIG. 33. Then, the main tray 11 is inserted into the outer casing 1. At the time of insertion, the sub tray 12 remains retreated and lowered, and the legs 19a and 20a of the holding claws 19 and 20 are shifted from the bosses 22 and 23 of the mold base 4, and are not opposed thereto. In this state, the holder 6 is swung downward, as shown in FIG. 34, so that the optical disk D in the cartridge K is set on the turntable 13 of the spindle motor 8. At the time, the legs 19a and 20a of the holding claws 19 and 20 do not touch the bosses 22 and 23, and the tip ends of the holding claws 19 and 20 are not raised.

As described above, the tip ends of the holding claws 19 and 20 are not raised when the cartridge K is loaded. Since a space for preventing interference is not required between the holding claws 19 and 20 and the cartridge K, the optical disk apparatus can be as small as possible.

Figure 35:
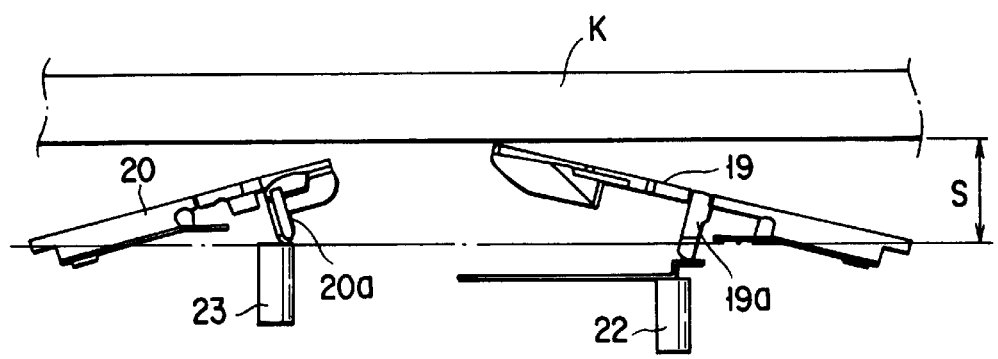
FIG. 35 shows a space that is provided between a cartridge and a holding claw in the prior art.

As shown in FIG. 35, in the conventional art, the tip ends of the holding claws 19 and 20 are raised when the cartridge K is loaded, so that an interference prevention space S is required between the holding claws 19 and 20 and the cartridge K. If this conventional art is utilized as it is, it is necessary to provide a space S, resulting in an increase in the size of the optical disk apparatus.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalent.

What is claimed is:

1. An optical disk apparatus comprising:

an outer casing;

tray means, being movable into or out of the outer casing, said tray meaning including a sub tray for supporting a first optical disk and a main tray for supporting a cartridge containing a second optical disk therein, said main tray movably supporting the sub tray;

a holding member slidable on the sub tray and having a tip end, said holding member being slid and holding and pressing the first optical disk against the mounting surface at the tip end when the tray means is positioned in the vertical direction;

optical disk driving means, arranged inside the outer casing, for rotating the first optical disk or the second optical disk when the first optical disk or the second optical disk is fitted thereon after the tray means mounting the first optical disk or the cartridge is conveyed into the outer casing while being held on the tray means;

a push-up member projected inside the outer casing; and retreat means for placing the holding member into contact with the push-up member and pushing up the holding member so as to retreat the tip end of the holding member in a direction away from the first optical disk, when the first optical disk held by the holding member is fitted on the optical disk driving means, and for preventing the holding member from contacting the push-up member so as to keep the holding member stationary when the cartridge is placed on the tray means and fitted on the optical disk driving means.

* * * * *